March 19, 1946.  H. C. HAYES ET AL  2,396,699
DETECTING DEVICE
Filed Sept. 24, 1941
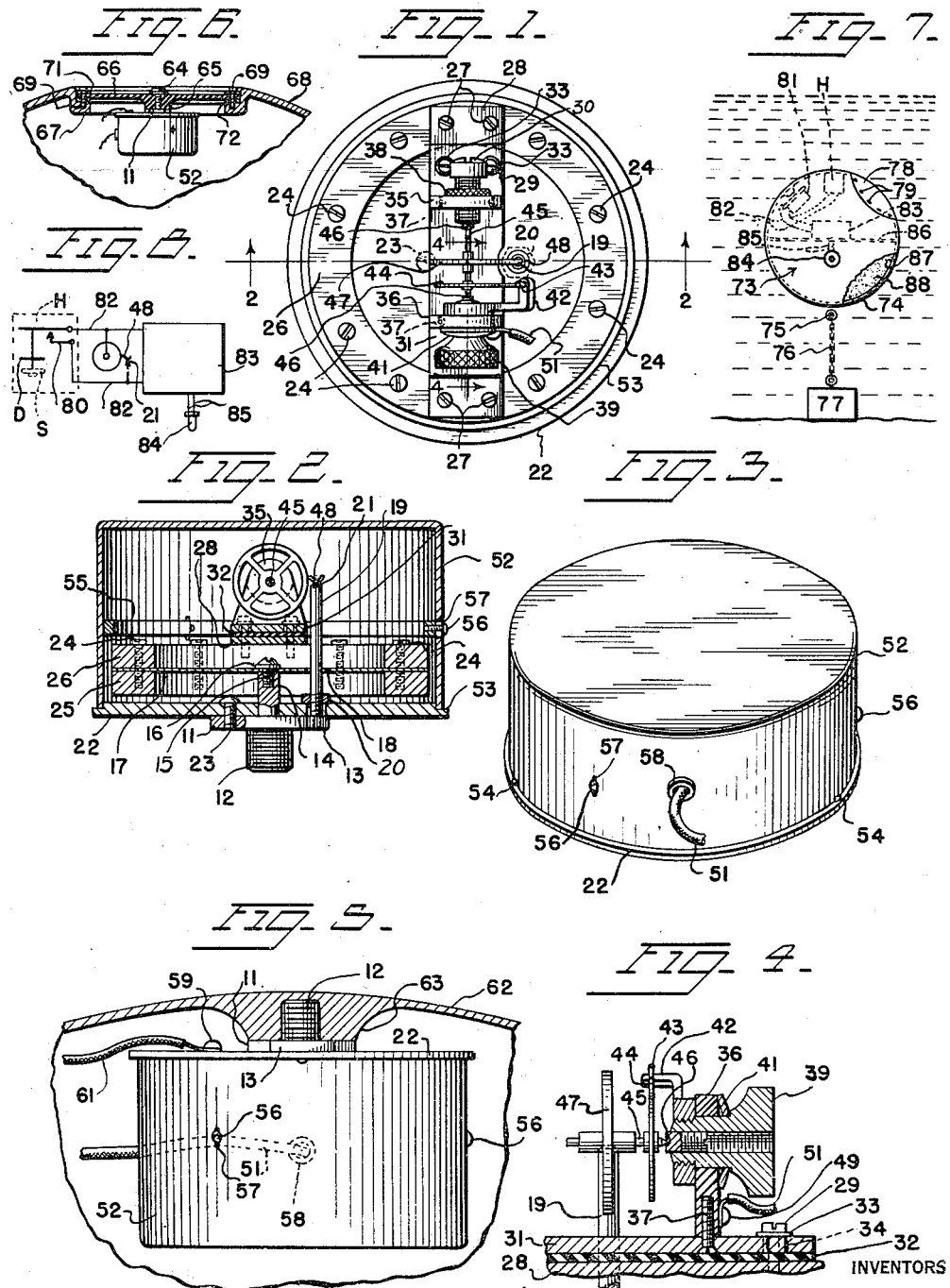
INVENTORS
H. C. HAYES
S. L. QUIMBY
BY
ATTORNEY Patented Mar. 19, 1946

2,396,699

UNITED STATES PATENT OFFICE 2,396,699

DETECTING DEVICE

Harvey C. Hayes, Washington, D. C., and Shirley L. Quimby, New York, N. Y.

Application September 24, 1941, Serial No. 412,112

12 Claims. (Cl. 200—52)

(Granted under the act of March 3, 1883, as amended April 30, 1928; 370 O. G. 757)

This invention relates to devices for detecting vibrations or pulsations received through an elastic medium. More specifically the invention relates to an improved detecting device adapted to be attached to a submarine mine and having means responsive to vibrations or pulsations received from an approaching vessel for controlling the detonation of the mine.

In devices of this character heretofore devised it has been the general practice to provide an arrangement in which a vibrating element such as a rod or tube causes a wheel or bar to be actuated about fixed pivot supports from a normal or rest position by a series of blows or impulses imparted thereto by the vibrating element, thereby to disengage a pair of electrical contacts and interrupt an electrical circuit.

In the device of the present invention, the pivoted wheel is yieldably mounted on a structure supported by a flexible diaphragm in such a manner that the wheel and supporting pivots are caused to vibrate by movement of the diaphragm and thereby set the wheel into oscillation about the pivot supports by the impact of the wheel against a fixed contact. An arrangement is thus provided in which the vibration of the pivot supports causes friction of the pivots against the pivot bearings to be reduced and the sensitivity of the device to be correspondingly increased.

One of the objects of the invention is the provision of new and improved means for detecting vibrations or pulsations transmitted through an elastic medium from a distant source.

Another of the objects is the provision of a device responsive to vibrations or pressure impulses in which the effects due to friction of the oscillating element are substantially reduced.

Another of the objects of the present invention is to provide a new and improved acoustic detecting device of simple and rugged construction which will be economical to manufacture and possess the desired qualities of reliability and efficiency in use and operation.

Another object is to provide a new and improved device for detecting vibrations or pressure impulses from an approaching vessel which, when used as a trigger mechanism of a mine, is adapted to withstand the rough handling of transportation and planting without injuring or changing in any way the adjustment and mechanical balance of any of its component parts.

Still other objects, advantages, and improvements will be apparent from a consideration of the following description taken in connection with the accompanying drawing of which:

Fig. 1 is a view of the device with the cover removed;

Fig. 2 is a view, partially in section, taken substantially along the line of 2—2 of Fig. 1;

Fig. 3 is a view of the device of Fig. 1 with the cover in the assembled position;

Fig. 4 is a view somewhat enlarged, partially in section and partially broken away, taken substantially along the line 4—4 of Fig. 1;

Fig. 5 is a view partially in section of the device assembled within the casing of a mine;

Fig. 6 is a view, somewhat reduced and partially in section, showing an alternative arrangement for mounting the device of Fig. 1;

Fig. 7 shows the device operatively connected to a submarine mine; and

Fig. 8 shows in diagrammatic form a circuit arrangement suitable for use with the device of the present invention.

Referring now to the drawing on which like numerals of reference are employed to designate like parts throughout the several views, and more particularly to Figs. 1 and 2 thereof, there is shown thereon a detecting device according to a preferred embodiment of the invention. The device comprises a support 11 having a threaded portion 12 projecting therefrom by means of which the device may be securely mounted to the casing of a mine or to a flexible diaphragm secured thereto, as the case may be, the support including a plurality of parallel surfaces 13 adapted to receive a suitable tool such, for example, as a spanner wrench by means of which the device is secured to a supporting member. The support 11 also comprises a post 14 to which is secured as by the screw 15 and washer 16 a thin flexible diaphragm 17 preferably circular in shape and of material suitable for the purpose such, for example, as Phosphor bronze or sheet steel. The diaphragm is provided with an aperture 18 within which is disposed a post 19 secured to the support 11 as by threading the parts together and provided with the contact 21 at one end thereof. A circular base 22 provided with an aperture within which the post 14 is disposed is secured to the support 11 as by the screw 23 and nut 20 threaded on the post 19.

Securely clamped to the diaphragm 17 as by the screws 24 are a pair of annular members 25 and 26 of any material suitable for the purpose such, for example, as brass, Phosphor bronze or the like whereby the annular members are yieldably supported by the flexible diaphragm and brought into movement with respect to the support 11 in response to vibrations or pressure impulses applied to the support. Secured to the member 26 as by the screws 27 is a mounting strip 28 having a plurality of tapped holes therein adapted to receive the screws 29 by means of which a plate 31 is secured to the mounting strip. A strip of insulating material 32 of suitable material such, for example, as rubber, Bakelite or the like, is inserted between the plate 31 and the mounting strip 28 thereby to maintain the plate electrically insulated from the strip, the plate being additionally insulated by the insulating washers 33 disposed beneath the heads of the screws 29 and the insulating sleeves 34. The plate 31 is provided with upright supports 35 and 36 secured thereto as by the screws 37, the support 35 having a threaded hole therein adapted to receive the adjustable screw 30. A nut 38 is provided upon the screw 30 for maintaining the screw in an adjusted position with respect to the upright 35. The upright 36 is provided with an aperture adapted to receive the adjusting screw 39, Figs. 1 and 4, about which is disposed the spring washer 41 and the threaded arm 42 whereby the arm may be moved to any desired setting by the screw 39 and maintained in the set position by the spring washer 41. Secured to the arm 42 as by the taper pin 43 is a resilient spring 44 known in the trade as a hair spring, having the other end thereof in engagement with the shaft 45. The screws 30 and 39 are each provided with a tapped hole concentric with the axis of the screws within which is disposed the pivot screw bearing 46 by means of which the shaft 45 is pivotally mounted for oscillation about the pivot supports. The balance wheel 47 is secured to the shaft 45 in any suitable manner and is rotatable with the shaft, the balance wheel being provided with an electrical contact 48 adapted to engage contact 21 affixed to the post 19 and be stopped thereby when the device is in a state of rest, the pressure between the contacts 48 and 21 being maintained at a predetermined value by the hair spring 44 in accordance with the setting of the adjusting screw 39. As shown on Fig. 2 of the drawing the contact member 48 is adapted to be brought into engagement with the plate 31 and thereby limit the angular movement of the balance wheel 47 in one direction when the vibrations or pulses of pressure received by the detecting device are of sufficient intensity, the movement of the balance wheel in the other direction being arrested by the post 19. The support 36 is provided with a screw 49 by means of which the conductor 51 is maintained in electrical connection with the contact 48.

A detachable cover 52 preferably circular in shape is fitted to a base plate 22, the edge of the cover preferably engaging the shoulder 53 on the plate. The cover may be maintained in the assembled position in any convenient manner as by soldering or brazing the parts together as at 54.

The cover is provided with an annular member 55 secured thereto as by the screws 56 passing through the slots 57 within the cover whereby the member 55 may be set or adjusted in any predetermined or desired position thereby providing a structure wherein the movement of the diaphragm 17 is limited by the member 55 and injury or damage thereto is prevented when the device is subjected to a severe shock such, for example, as may result from the planting or launching of the mine. The cover 52 is provided with a suitable aperture within which is disposed an insulated bushing 58, the conductor 51 emerging from the assembled device from an aperture within the bushing.

The base 22 is provided preferably with a screw 59 by means of which the electrical conductor 61 is maintained in continual electrical connection with the contact 21.

The entire device is secured to the casing of the mine 62 in any suitable manner such, for example, as by providing a boss or raised portion 63 on the casing of the mine, Fig. 5, and threading the stud 12 of the support 11 into a suitable complementary portion of the boss or raised portion.

An alternative form of structure is illustrated on Fig. 6 in which the acoustic device is secured by the nut 64 to a boss 65 of a flexible diaphragm 66. The diaphragm may be of any material suitable for the purpose such, for example, as rubber, Phosphor bronze, or the like whereby the diaphragm is responsive to vibrations received through the water within which the mine is planted, and in which a somewhat greater degree of sensitivity is obtained than with the arrangement of Fig. 5. The diaphragm 66 is secured to a shoulder 67 formed on the casing 68 of the mine and secured thereto as by the bolts 69 passing through a retaining ring 71. A gasket 72 is provided preferably between the diaphragm 66 and the shoulder 67 to insure a water-tight connection therebetween and to prevent seepage of the water within the mine.

On Fig. 7 is illustrated a complete mine indicated generally by the numeral 73 of the buoyant type suitable for use with the device of the present invention comprising a casing 74 having an eye bolt 75 secured thereto by means of which the mine is moored. Secured to the eye bolt as by the chain 76 is a weight or anchor 77 for maintaining the mine in a moored position. The mine is provided with an aperture sealed by the cover 78, the bolts 79 being provided for maintaining the cover in hermetically sealed relation to the casing. The acoustic detecting device 81 is mounted within the mine as in the manner illustrated, and connected by the conductors 82 to the mine firing mechanism indicated generally by the numeral 83. The mine is also provided preferably with a detonating device 84 connected with the mine firing mechanism by means of the conductors 85 and adapted to be detonated by a battery included within the mine firing mechanism. The casing is also provided with a bulkhead or partition 86 thereby forming a chamber 87 within which is disposed an explosive charge 88.

Referring now particularly to Fig. 8, it will be noted that the conductors 82 also extend to a safety switch 80 held in the closed position by the hydrostat indicated generally by the letter H provided with a soluble washer S to prevent movement of the flexible diaphragm D of the hydrostat and disengagement of the contacts 80 until the soluble washer has dissolved or softened sufficiently to permit movement of the hydrostat by the pressure of the water within which the mine is immersed, as is well known in the art to which the present invention pertains. An arrangement is thus provided whereby premature detonation during the transportation, handling and planting of the mine is prevented and the mine is rendered absolutely safe until a predetermined period of time has elapsed after the mine has been launched.

The flexible diaphragm D is hermetically sealed to the casing of the mine and adapted to be flexed by the pressure of the body of water within which the mine is submerged when the soluble washer has dissolved. When this occurs, the pressure of the water against the diaphragm causes the contacts 80 to be disengaged thereby bringing the mine firing mechanism under the control of the contacts 48 and 21 of the acoustic detector and arming the mine.

The operation of the device will now be described.

Let it be assumed by way of example that the mine 73 is moored beneath the surface of a body of water, Fig. 7, adjacent the path of travel of an approaching vessel and that the mine is in an armed condition. As is well known, the action of the ship's propeller causes vibrations or pulsations of pressure to be transmitted through the water surrounding the vessel. These vibrations or pressure pulsations increase in intensity as the propeller approaches the mine and are, in general, most pronounced within an area underneath the propeller of the ship. In general, it has been found that a considerable range of frequencies is transmitted by the propeller of a ship in motion. The device of the present invention, when employed in the manner of Figs. 5, 6 or 7, has been found to operate satisfactorily when tuned to a frequency of 250 cycles per second although it will be understood that, if desired, the device may be pitched for operation at any of the frequencies of the sonic range of frequencies generated by the ship's propeller.

The sound intensity received through the water is of a relatively small value in the area ahead of the ship as the ship is propelled through the water, increasing somewhat as the bow of the ship passes the mine and thereafter increasing progressively until the ship's propeller is above the mine. The acoustic device of the present invention is adjusted to operate on a strength or intensity of signal received from the ship's propeller corresponding generally to the intensity of signal detected beneath the forward or amidship portion of the vessel. When such a signal is received the casing of the mine or the diaphragm 66, as the case may be, vibrates sufficiently to cause the balance wheel and pivot supports to be set into vibration by movement of the flexible diaphragm 17 of the device sufficiently to disengage contact 48 from contact 21 thereby interrupting a control circuit to the firing mechanism and causing the firing mechanism to operate and explode the mine beneath a vulnerable portion of the vessel. The movement of the flexible diaphragm 17 with respect to the supporting post 14 causes the balance wheel and supporting shaft 45 to vibrate thereby reducing the friction at the pivot supports and causing the balance wheel to be set into oscillation by blows or pressure impulses of the contact 48 against the contact 21 secured to the post 19.

In the event that the arrangement of Fig. 6 is employed, the movement of the flexible diaphragm 66 in response to vibrations or pressure impulses received through the water from the moving ship causes the post 14 attached to the flexible diaphragm 17 of the device to receive vibrations of greater amplitude than the vibrations of the casing 68 of the mine, whereby the sensitivity of the device may be increased or, if desired, the adjusting screw 39 may be given a setting such that the pressure between the contacts 48 and 21 with the device in a state of rest may be increased without reducing the sensitivity of the device.

Briefly stated in summary the present invention provides a compact tuned acoustic detecting device of symmetrical proportions which is economical to manufacture, rugged in construction, reliable in operation, and which may be readily assembled to the casing of a mine or to a flexible diaphragm secured thereto.

While the invention has been described with particularity as to one preferred embodiment of a combination of mechanisms and of each of the elements of the combination, it is to be understood that this has been done for purposes of disclosure and that various changes and substitutions may be readily apparent to those skilled in the art to which the invention pertains, after understanding the invention herein disclosed, and that the terms employed in the appended claims are to be considered as words of description rather than words of limitation.

The invention herein disclosed and claimed may be manufactured and used by and for the Government of the United States of America for governmental purposes without the payment of any royalties thereon or therefor.

What is claimed as new and desired to be secured by Letters Patent of the United States is:

1. A device of the character disclosed for detecting vibrations within an elastic medium comprising a support adapted to respond to said vibrations, a substantially circular flexible diaphragm secured to said support, an annular member secured to said diaphragm and disposed about the support, a balance wheel pivotally supported on said annular member and having a contact element secured thereto, contact means rigidly secured to said support and adapted to engage said contact element when the balance wheel is in a predetermined position, a shaft for said balance wheel, a resilient member operatively connected to said shaft, means for causing said contact to be urged by said resilient member into continuous engagement with the contact means when no vibrations are received by the device, and means settable at will for causing the contact element to be disengaged from said contact means in response to vibrations of the shaft and balance wheel of predetermined amplitude received from said diaphragm.

2. A device of the character disclosed for detecting vibrations within an elastic medium comprising a shaft, an inertia element secured to said shaft, means including a pair of pivot bearings for pivotally supporting said shaft and inertia element, an electrical contact secured to said inertia element, a support for said device, contact means rigidly secured to said support and adapted to be engaged by said electrical contact when the inertia element is in a predetermined position, means operatively connected to said shaft for yieldably urging the electrical contact against said contact means, and means including a flexible diaphragm secured to said support for causing amplified movement of the pivot bearings and shaft in response to vibrations received through said elastic medium.

3. A device of the character disclosed for detecting vibrations within an elastic medium comprising a support having an electrical contact affixed thereto, a balance wheel having a contact member thereon adapted to engage said electrical contact, a shaft for said balance wheel, means for pivotally mounting said shaft, a flexible diaphragm secured to said support, means including an annular member for securing said shaft mounting means to the diaphragm, and means settable at will for yieldably urging said contact member continuously against said electrical contact when the device is in a state of rest and for causing the contact member to be repeatedly disengaged from said electrical contact as the shaft is vibrated by said flexible diaphragm in response to vibrations received by said support.

4. A device of the character disclosed for detecting vibrations within an elastic medium comprising an electrical contact, a pivoted inertia member operatively connected to said electrical contact, a support having a fixed contact thereon, means for yieldably maintaining said electrical contact in continuous electrical engagement with the fixed contact when the device is in a state of rest, and means including a resilient diaphragm for causing said electrical contact and inertia member to vibrate and oscillate in response to vibrations received from said elastic medium through said support sufficiently to disengage said electrical contact from the fixed contact.

5. An acoustic detecting device of the character disclosed disposed within a fluid comprising a flexible diaphragm, means for mounting said device for operation, means for securing the flexible diaphragm at the central portion thereof to said mounting means, an annular inertia member disposed about said supporting means and supported by said diaphragm, a pivoted wheel operatively connected to said inertia member and having an electrical contact thereon, a rigid member secured to said support and adapted to engage said electrical contact when the device is in a state of rest, and means including a spring member operatively connected to said pivoted wheel for causing the electrical contact to be repeatedly disengaged from said rigid member as the wheel is vibrated and oscillated by pressure impulses received from the fluid through said support.

6. In a tuned acoustic device for detecting vibrations received through an elastic medium, the combination of a support, an inertia member, means including a diaphragm for flexibly securing said inertia member to the support, a balance wheel pivotally mounted on said inertia member and electrically insulated therefrom, an electrical contact on said balance wheel, a fixed contact secured to said support and adapted to be engaged by said electrical contact, means for yieldably maintaining the electrical contact in continuous engagement with the fixed contact when the device is in a state of rest and for causing the contacts to be momentarily engaged at intervals while the balance wheel is vibrating and oscillating in response to vibrations received by said support.

7. In a tuned acoustic device for detecting vibrations received through an elastic medium, the combination of a support, an annular inertia member, means including a diaphragm having an aperture therein for flexibly securing said inertia member to the support, a balance wheel pivotally mounted on said inertia member and having an electrical contact thereon, a post secured to the support and disposed within said aperture and said inertia member, a contact fixed on said post and adapted to be engaged by said electrical contact, means for yieldably maintaining the electrical contact in continuous engagement with the fixed contact when the device is in a state of rest and for causing the contacts to be disengaged at intervals while the balance wheel is vibrating and oscillating in response to movement of said inertia member as vibrations are received by the support, and means settable at will for limiting the degree of movement of said inertia member relative to said support.

8. In a firing mechanism for a submarine mine, the combination of a tuned acoustic device for detecting vibrations received from an approaching vessel, a support for said device, a flexible diaphragm secured to said support, a balance wheel pivotally mounted on said flexible diaphragm, means for causing said balance wheel to vibrate and oscillate in response to vibrations received by the support, a control circuit operatively connected to said acoustic device, means controlled by the degree of movement of said balance wheel for interrupting said control circuit as vibrations are received by said support, and means settable at will for preventing said interruption of the control circuit until a predetermined period of time has elapsed after the first of said vibrations are received.

9. In a device of the character disclosed disposed within a fluid for detecting pressure impulses within the fluid, the combination of a submarine mine having a casing thereon, a flexible diaphragm secured to said casing and hermetically sealed thereto, means including a support for attaching the device to the central portion of said diaphragm within the casing, a second diaphragm disposed within the device and secured to said support at the central portion thereof, an annular inertia member supported by said second diaphragm, a pivoted contact supported by said inertia member and electrically insulated therefrom, a post secured to said support having a second contact thereon adapted to be engaged by said pivoted contact, resilient means for urging said pivoted contact into continuous engagement with said second contact when the device is in a state of rest, and means including a balance wheel adapted to be vibrated and oscillated in response to the movement of said first and second diaphragms for causing the pivoted contact to be disengaged at intervals from said second contact while vibrations are being detected by the device.

10. In a device of the character disclosed for detecting pressure impulses within an elastic medium, means for mounting the device, an annular inertia ring yieldably supported by said mounting means, a pivoted balance wheel mounted on said inertia ring and having an electrical contact member operatively connected thereto, a stop device comprising a contact member secured to said mounting means adapted to engage said electrical contact member and arrest the angular movement of said balance wheel in one direction, yieldable means operatively connected to said balance wheel for causing oscillatory movement of the balance wheel as the wheel is vibrated in response to pressure impulses received by the mounting means, and means for limiting said oscillatory movement of the balance wheel in the other direction while pressure impulses of predetermined intensity are being detected by the device.

11. In a tuned acoustic device for detecting vibrations received through an elastic medium, the combination of a support, an annular inertia member, means including a diaphragm having an aperture therein for flexibly securing said inertia member to the support, a balance wheel pivotally mounted on said inertia member and having an electrical contact thereon, a post secured to the support and disposed within said aperture, a contact fixed on said post and adapted to be engaged by said electrical contact, means for yieldably maintaining the electrical contact in continuous engagement with the fixed contact when the device is in a state of rest and for causing the contacts to be disengaged at intervals while the balance wheel is vibrating and oscillating in response to movement of said inertia member as vibrations are received by the support, a cylindrical casing adapted to be secured to the support, and an annular stop member settable at will to different positions within said casing for limiting the degree of movement of said inertia member relative to said support.

12. In a firing mechanism for a submarine mine, the combination of a tuned acoustic device for detecting vibrations received from an approaching vessel, a support for said device, a flexible diaphragm secured to said support, a balance wheel pivotally mounted on said flexible diaphragm and electrically insulated therefrom, means for causing said balance wheel to vibrate and oscillate in response to vibrations received by the support, a control circuit including a pair of electrical conductors operatively connected to said acoustic device, a pair of contact devices connected to said balance wheel and the support respectively adapted to establish an electrical connection between said pair of conductors when the balance wheel is at rest thereby to close said control circuit, means controlled by the degree of movement of said balance wheel for interrupting said control circuit as vibrations are received by said support, and means settable at will for preventing said interruption of the control circuit until a predetermined period of time has elapsed after the first of said vibrations are received.

HARVEY C. HAYES.
SHIRLEY L. QUIMBY.